United States Patent [19]

Poelma

[11] Patent Number: 4,787,503
[45] Date of Patent: Nov. 29, 1988

[54] DEVICE FOR THE CONVEYANCE OF BULK MATERIAL

[75] Inventor: Cornelis F. Poelma, Nuenen, Netherlands

[73] Assignee: Intertransshipment B.V., Netherlands

[21] Appl. No.: 28,603

[22] Filed: Mar. 20, 1987

[30] Foreign Application Priority Data

Mar. 26, 1986 [NL] Netherlands ............. 8600781

[51] Int. Cl.4 ............................. B65G 25/02
[52] U.S. Cl. ..................... 198/776; 198/631
[58] Field of Search .......... 198/621, 775, 776, 614, 198/631

[56] References Cited

U.S. PATENT DOCUMENTS 4,398,627  8/1983  Saccani .............. 198/621 X
4,407,408 10/1983  Olson ................ 198/621
4,615,433 10/1986  Ottow ............... 198/771 X Primary Examiner—Robert J. Spar
Assistant Examiner—Cheryl L. Gastineau
Attorney, Agent, or Firm—Lucas & Just

[57] ABSTRACT

Device for the conveyance of material, in particular bulk material, comprises at least two parallel, mating trough-type conveyor elements which can move lengthwise relative to each other. Each conveyor element has an essentially U-shaped cross section. The open sides of the conveyor elements face each other, with the free edges of the side walls essentially resting against each other, so that a closed conveyance space is produced in the form of an oblong conveyor box. The two conveyor elements are provided with a cyclical drive which acts both transversely to and in the lengthwise direction of the conveyor elements, the drive of the two elements when transverse to the lengthwise direction being in phase, and in the lengthwise direction exhibiting a relative phase shift of about 180 degrees.

17 Claims, 7 Drawing Sheets

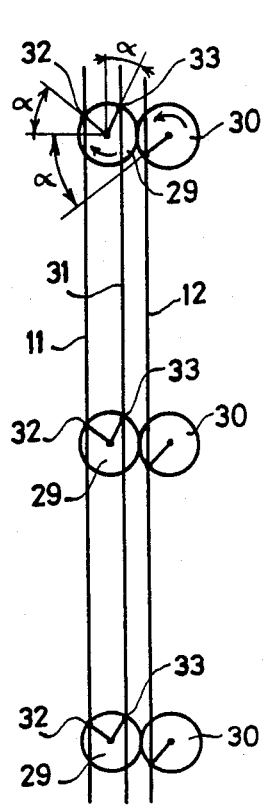
FIG:3.
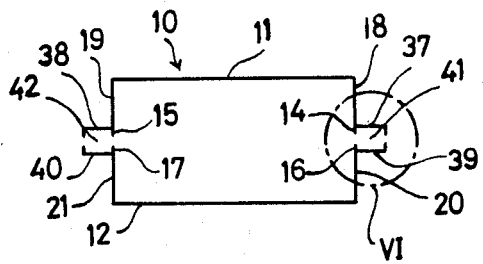
FIG:5.
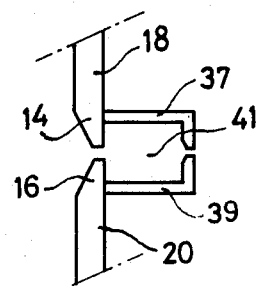
FIG:6.
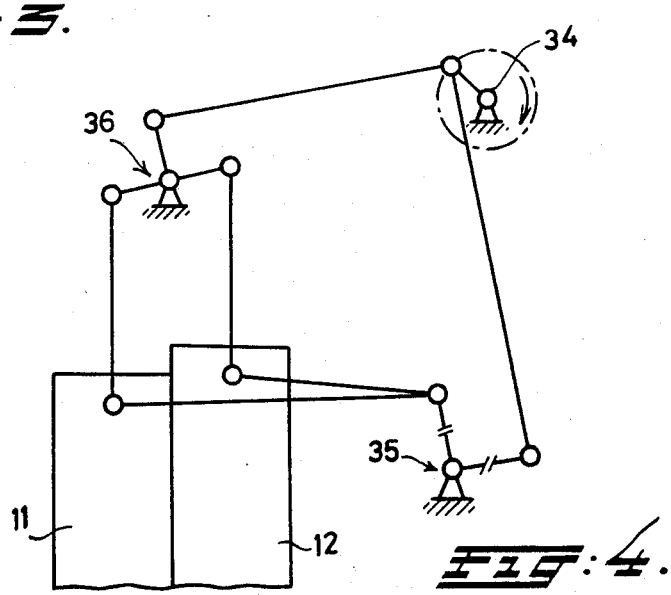
FIG:4.

DEVICE FOR THE CONVEYANCE OF BULK MATERIAL

BACKGROUND OF THE INVENTION

The invention relates to a device for the conveyance of material, in particular bulk material, comprising at least one trough-type conveyor element with a cyclical drive for transmitting a propelling force periodically to the material present in the trough-type conveyor element at least in the envisaged direction of conveyance.

Such a device is known as the so-called vibrating trough or throwing trough. In the case of a vibrating or throwing trough, the trough-type conveyor element is set up essentially horizontally. The trough-type element is driven cyclically both in the vertical and in the horizontal direction, so that the material to be conveyed gains acceleration in both the vertical and the horizontal direction in the trough-type element. The material is thereby conveyed in the horizontal direction through the trough-type conveyor element. In order to increase the conveyance speed of a vibrating trough, the vertical trough acceleration is increased to above the acceleration of gravity, which produces a so-called throwing trough, in which the maximum vertical acceleration is in practice about three times the acceleration of gravity.

The known vibrating and throwing troughs have, however, a number of disadvantages. The conveyance of the material can take place only virtually horizontally, with the speed of conveyance being relatively low. Although in throwing troughs the speed of conveyance is somewhat higher, the greater accelerations give rise to collision forces between the trough and the material, and fluidization occurs, which has an adverse effect on the speed of conveyance. Vertical accelerations which are greater than about three times the acceleration of gravity also give an insufficient increase in the only low horizontal speed of conveyance. The virtually horizontal propelling force occurs in throwing troughs only during the brief contact times (collision time) between the material and the trough, in which case the chance of damage due to the collision forces occurring is relatively great.

SUMMARY OF THE INVENTION.

The object of the present invention is to provide a device for the conveyance of material, in particular bulk material, in which much greater conveyance speeds can be achieved without collisions between the material being conveyed and the trough-type element occurring, and without fluidization of the material taking place, and in which the conveyance can take place at any desired angle, thus also vertically.

This object is achieved with a device of the type mentioned in the preamble, which is characterized in that provision is made for at least two parallel, mating trough-type conveyor elements which can move lengthwise relative to each other, and which each have an essentially U-shaped cross section and with their open sides facing each other, with the free edges of the side walls essentially resting against each other, so that a closed conveyance space is produced in the form of an oblong conveyor box, and the two trough-type conveyor elements are provided with a cyclical drive which acts both transversely to and in the lengthwise direction of the trough-type conveyor elements, the drive of the two elements when transverse to the lengthwise direction being in phase, and in the lengthwise direction exhibiting a relative phase shift of about 180 degrees.

The conveyor box formed can be filled completely with the material for conveyance, while through the cyclical movement of the two trough-type conveyor elements the material for conveyance periodically presses a half stroke on the first trough-type element and subsequently about a half stroke on the second trough-type element, so that it is possible during the half period in which the material for conveyance presses against one of the trough-type elements to transmit a propelling force to the material in the direction of conveyance by shifting the trough-type element in the direction of conveyance and in the meantime shifting back the other trough-type element on which no material is pressing. In this way the link with the acceleration of gravity is broken, and a very controlled conveyance takes place without collisions and fluidization occurring. The speeds of conveyance can here be one order greater than in the case of the known vibrating and throwing troughs, while the conveyance can take place at any desired angle.

The device according to the invention can be used for, for example, unloading bulk ships of large (for example, 5,000 tons per hour), internal transportation of bulk and uniform piece goods in silos, stores and coal mines.

The two trough-type conveyor elements can be driven in various ways. The device is preferably provided with a rod mechanism for driving the two trough-type conveyor elements both transversely to and in the direction of conveyance, in which case the rod mechanism is advantageously provided with a central drive.

It is also possible to link together the two trough-type conveyor elements by means of at least one pair of mating toothed wheels, at least one of which can be driven, with the toothed wheels connected to one of the trough-type elements preferably being linked to each other by means of a synchronization rod running in the lengthwise direction parallel to the trough-type element, while the fastening points of the trough-type element and the synchronization rod on a toothed wheel are at an angle to each other which is smaller than 180 degrees, and is preferably 90 degrees.

In another possible embodiment of the device according to the invention one of the two trough-type conveyor elements is connected to a drive mechanism, and the two trough-type elements are connected to each other by means of elements with spring action in the direction of conveyance, for example leaf springs running transversely to the trough-type elements, and being connected by their ends to the side walls of the trough-type elements.

The drive of the two trough-type conveyor elements is preferably such that the amplitude of the movement of the two trough-type elements transverse to the direction of conveyance differs from that in the direction of conveyance, and the amplitude of the movement in the direction of conveyance is expediently greater than that transverse to the direction of conveyance.

In order to obtain a good seal between the two trough-type conveyor elements moving relative to each other, each of the two trough-type conveyor elements is expediently provided, near the free edges of the side walls, with an outward-projecting flange running in the lengthwise direction of the trough-type element, the free edge of which flange is bent over in the direction of the other trough-type element, so that a conveyor box with smaller dimensions is obtained at both sides of the conveyor box.

In order to feed the material at the infeed side into the conveyor box, the conveyor box is expediently made double at the infeed side over a certain length, with a common two-sided trough-type conveyor element disposed between the two adjacent conveyor boxes, with the ends of the two outside trough-type elements at the infeed side being connected together by a closed end wall, and the end of the common trough-type conveyor elements being at a distance from the closed end wall.

In a preferred embodiment of the device, a screw conveyor is disposed at the infeed side of the conveyor box, for the infeed of the material to the conveyor box.

In order to be sure that sufficient infeed of material always takes place at the infeed side of the conveyor box, the screw conveyor is placed on the side edge of the conveyor box, while the axis of the screw conveyor is perpendicular to the lengthwise direction of the conveyor box, and the pitch of the conveyor screw increases to infinity towards the end of the screw, so that the conveyor screw operates there as an axially fed throwing wheel. As a result, a continuous impulse force acts underneath against the column of bulk material in the conveyor box.

In order to make the whole device operate in balanced fashion, the device comprises two conveyor boxes arranged parallel to each other, and capable of moving transversely to the direction of conveyance in opposite directions.

The invention will now be explained by the description below of an example of an embodiment of the device according to the invention with reference to the drawing.

BRIEF DESCRIPTION OF THE DRAWINGS

FIG. 3 shows schematically another embodiment of the drive of the conveyor elements with coupled toothed wheels.

FIG. 4 shows schematically an embodiment of the drive of the conveyor elements with a rod mechanism.

FIG. 5 is a cross section of the conveyor box according to the invention.

FIG. 6 shows a detail VI of FIG. 5 on an enlarged scale.

DETAILED DESCRIPTION OF THE PREFERRED EMBODIMENTS

Figure 1:
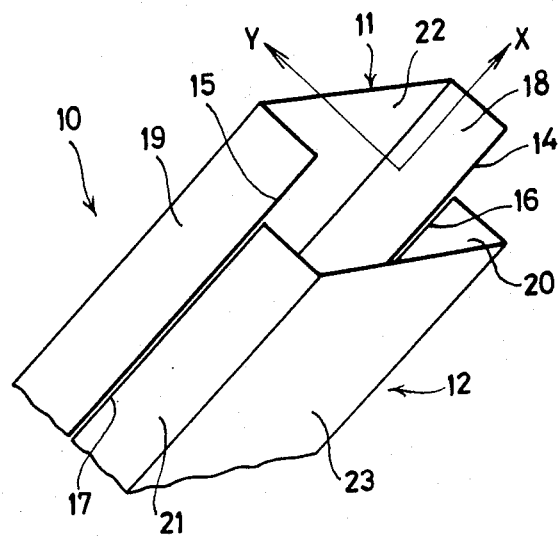
FIG. 1 shows schematically part of a conveyor box of the device according to the invention.

As shown in FIG. 1, the conveyor box indicated in general by 10 is formed by two parallel, mating trough-type conveyor elements 11 and 12. The trough-type elements 11 and 12 have an essentially U-shaped cross section and face each other with the open sides. The free edges 14, 15, 16, 17 of the side walls 18, 19, 20, 21 of the U-shaped elements 11, 12 rest essentially against each other. A closed, tubular conveyor space is thus formed.

The two trough-type conveyor elements 11, 12 are provided with a cyclical drive which operates both transversely to and in the lengthwise direction of the trough-type elements, with the drive of the two elements being in phase when transverse to the lengthwise direction, and in the lengthwise direction exhibiting a relative phase shift of about 180 degrees.

The operation of such a conveyor box is based on the principle that the material present in the conveyor box is pressed alternately into one of the two trough-type conveyor elements 11, 12. The direction of conveyance which corresponds to the lengthwise direction of the trough-type elements is indicated as X-direction, and the direction of movement of the trough-type elements transverse to the direction of conveyance is indicated as Y-direction, with the direction of the arrow being taken as positive.

By giving the whole conveyor box 10 sufficient speed in the negative Y-direction, the material for conveyance present in the conveyor box is pressed against the trough 11 as a result of the acceleration forces. If the trough at the same times moves in the positive X-direction, the material for conveyance will also be moved in the positive X-direction. At the same time, the trough 12 can be moved practically without friction relative to the material for conveyance (with the exception of the side walls 20 and 21 of the trough 12) in the negative X-direction. This means that a half cycle of the movement of the conveyor box 10 has been described. In the next half cycle the whole conveyor box 10 is accelerated in the positive Y-direction, as a result of which the material for conveyance present in the conveyor box is pressed against the trough 12. If the trough 12 now moves in the positive X-direction, the material in the conveyor box is carried along by the trough 12. At the same time, the trough 11 can also be moved practically without friction relative to the material in the negative X-direction. After this, the above-described cycle is repeated.

The amplitude of the movement of the two troughs 11, 12 transverse to the direction of conveyance (Y-direction) and in the direction of conveyance (X-direction) can be the same, but can also be different, and in the latter case the amplitude of the movement in the direction of conveyance is greater than that transverse to the direction of conveyance. Each point of the troughs 11, 12 thus moves approximately according to a circle or an ellipse, viewed in a plane which is formed by the X- and Y-direction.

By making the product of the acceleration force exerted on the material to be conveyed by the troughs 11, 12 and the coefficient of friction between the troughs and the material to be conveyed greater than the weight of the material, it is possible to convey the material at any desired angle, even vertically upwards.

The bottoms 22, 23 of the troughs 11, 12 are preferable rough on the inside, in order to increase the coefficient of friction between the bottom of the trough and the material to be conveyed. The insides of the side walls 18, 19, 20 and 21 of the troughs 11, 12 are preferably smooth, in other to increase the efficiency of the conveyance.

Figure 15:
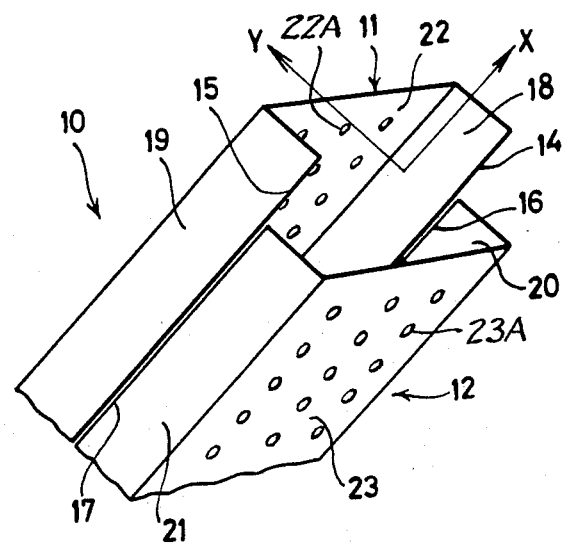
FIG. 15 shows schematically part of a conveyor box of the device according to the invention wherein the bottoms of the troughs have openings.

For certain applications the bottoms 22, 23 of the troughs, 11, 12 may be provided with openings 22A, 23A as shown in FIG. 15 such that the bottom 22, 23 of the troughs 11,12 can act as sieves. This makes it possible to separate smaller particles from the material during its conveyance.

The degree of filling of the conveyor box is virtually 100%. This means that the device can have a large capacity, no adverse fluidization effect occurs, and no adverse internal collisions occur, which could cause damage to the material.

The drive of the two conveyors can be designed in different ways.

Figure 2:
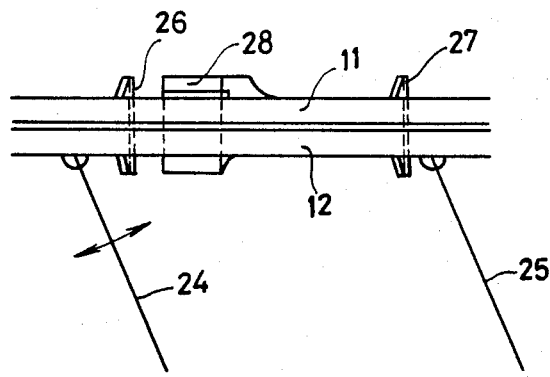
FIG. 2 shows schematically a particular embodiment of the drive of the trough-type conveyor elements.

FIG. 2 shows schematically a drive system in which the trough 12 is driven by slanting rods 24 and 25 which move essentially in the lengthwise direction of the trough. The trough 12 acts here as a kind of throwing trough. The other trough 11 is connected to the trough 12 by means of leaf springs 26, 27, which run transversely to the troughs 11, 12 and which with their ends are connected to the troughs 11, 12. The trough 11 and the springs 26 and 27 thus form a mass spring system. Through correct selection of the frequency of the movement of the rods 24 and 25, it can be ensured that the phase difference of the movement of the two troughs 11, 12 relative to each other is approximately 180 degrees. A stop 28 on the trough 11 helps to ensure that the movements of the two troughs 11, 12 are synchronized.

Through the controlled, forced movement of the material (no longer any free fall), the speed of conveyance in the conveyor box formed by the two troughs 11, 12 is many times greater than that in a conventional throwing trough. The embodiment shown in FIG. 2 can easily be obtained by conversion of an existing throwing trough.

FIG. 3 shows an embodiment of the drive of a vertically arranged conveyor box, in which the drive takes place using a number of pairs of coupled toothed wheels 29 and 30. The toothed wheels 29 connected to the trough 11 are coupled together by means of a synchronization rod 31 running lengthwise parallel to the trough 11. The fastening points 32 and 33 of the trough 11 and the synchronization rod on a toothed wheel 29 are at an angle which is smaller than 180 degrees, and is preferably 90 degrees. This means that the direction of rotation of the toothed wheels is ensured, and no "dead point" can occur.

The toothed wheels 29, 30 can be driven by separate drive elements (for example, hydraulic motors). It is also possible to drive the two troughs 11, 12 with a central motor, with the synchronization rod 31 then acting as a driving rod.

FIG. 4 shows schematically an embodiment of the drive of the troughs 11, 12 with a rod mechanism. The rod mechanism drives the troughs both transversely to and in the direction of conveyance. The rod methanism is provided with a central drive 34. Through the selection of the lever ratio of the toggle levers 35 and 36, the ratio between the amplitude of the movement transverse to the direction of conveyance and in the direction of conveyance of the troughs 11, 12 is set. In this way it is possible to create the best possible ratio between the normal force on the material for conveyance in the conveyor box and the throwing behaviour, as a result of which the capacity and the efficiency of the conveyor box can be increased further.

In order to obtain a good sealing of the conveyor box at the point of connection between the two troughs 11, 12, each of the two troughs 11, 12 (see FIGS. 5 and 6) is provided on the outside, near the free edges 14, 15 and 16, 17 of the side walls 18, 19 and 20, 21, with an outward-projecting flange 37, 38 and 39, 40, which runs in the lengthwise direction of the troughs 11, 12, and whose free edge is bent over in the direction of the other trough-type element 12, 11, so that on both sides of the conveyor 10 a conveyor box 41, 42 with smaller transverse dimensions is present and acts as a labyrinth gland.

The infeed side of the conveyor box can be designed in various ways.

Figure 7:
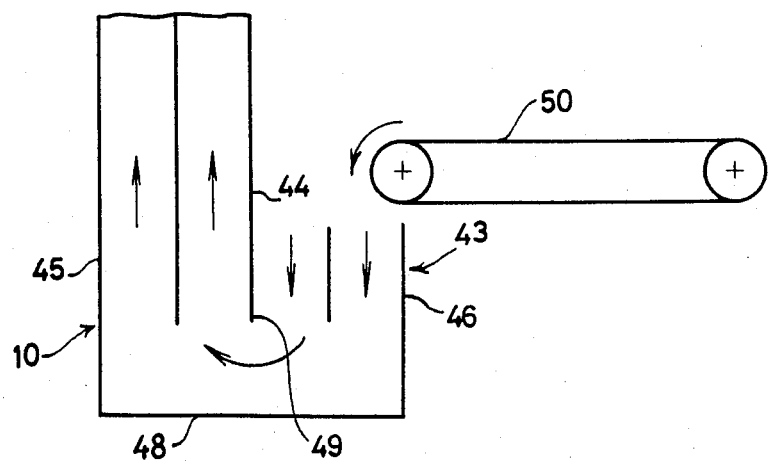
FIG. 7 shows schematically a particular embodiment of the infeed side of a conveyor box.

FIG. 7 shows an embodiment in which the conveyor box is double at the infeed side over a certain length, with a common two-sided trough-type conveyor element 44 disposed between the two adjacent conveyor boxes, i.e. the main conveyor box 10 and the infeed box 43. The ends of the two outside trough-type elements 45 and 46 situated at the infeed side are connected to each other by a closed end wall 48. The end 49 of the common trough-type conveyor element 44 is situated at a distance from the closed end wall 48.

The material to be conveyed is fed in to the feed box 43 from a conveyor belt 50. Through the movements of the double-sided trough-type element 44 and the trough-type conveyor elements 45 and 46 which are connected to each other, the material in the feed box in conveyed downwards, and in the main conveyor box upwards.

Figure 8:
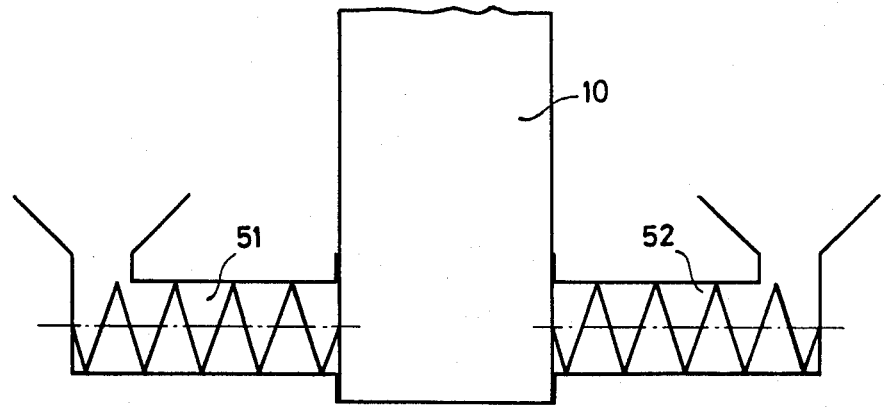
FIG. 8 shows schematically another embodiment of the infeed side of a conveyor box.
Figure 9:
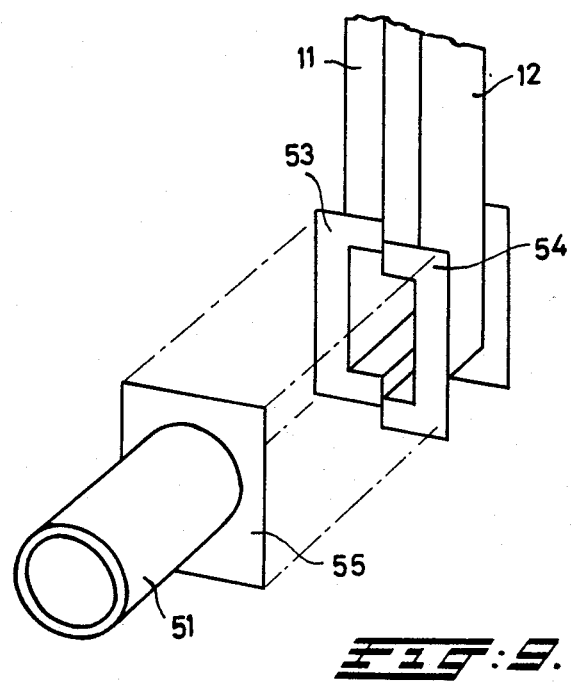
FIG. 9 shows a view in perspective of the infeed side of a conveyor box according to FIG. 8, with the screw conveyor shown at a distance from the conveyor box.

FIGS. 8 and 9 show an embodiment of the infeed side of the conveyor box 10 which is provided with screw conveyors 51 and 52 for feeding the material for conveyance to the conveyor box. The screw conveyors are disposed on the two side edges of the conveyor box 10. The seal between a screw conveyor and the conveyor box is formed by sliding flanges. Here the flange parts 53 and 54 of the troughs 11 and 12 slide along the flange 55 of the screw conveyor 51, 52.

Figure 10:
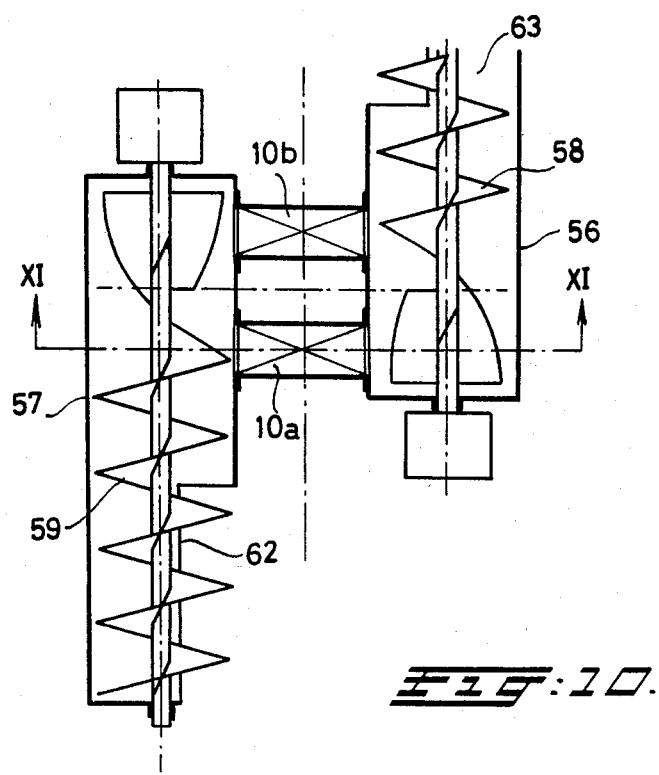
FIG. 10 is a cross section through two conveyor boxes arranged side by side, at the infeed point for the material.
Figure 11:
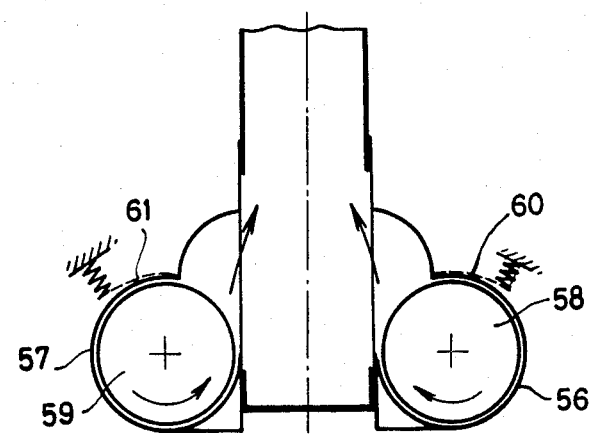
FIG. 11 is a cross section along the line XI—XI in FIG. 10.

FIGS. 10 and 11 show the infeed side of two adjacent conveyor boxes 10a and 10b with two screw conveyor 56 and 57 set up at the side edge of the conveyor boxes. The axis of the two screw conveyors 56 and 57 is perpendicular to the lenthwise direction of the conveyor boxes 10a and 10b. The pitch of the conveyor screw 58 and 59 of the screw conveyors 56 and 57 increases to infinity going towards the end of the screw. In this way the conveyor screws 58 and 59 near that end act as an axially fed throwing wheel. As a result, the material for conveyance is given a vertical infeed speed which is greater than the conveyance speed in the conveyor box itself, which means that a certain impulse force works continuously underneath against the columns of material in the conveyor boxes 10a and 10b. In order to prevent an accumulation of material occurring at the infeed side, the screw conveyors are provided with safety valves 60 and 61 which are under spring force, and through which excess material can be discharged. The conveyor boxes thus designed can be rotated or translated with the under side through the material for conveyance, and the material for conveyance goes into the screw conveyors through openings 62 and 63.

It will be clear that the system of infeed by means of a conveyor screw with a variable pitch becoming infinite towards the end can also be used in a single conveyor box, which is then provided with one screw conveyor.

It is desirable for the whole device to be balanced during operation. One single conveyor box is balanced in the lengthwise direction (X-direction in FIG. 1) without filling. With filling, a pulsing force occurs in the direction of conveyance due to the conveyance of the material through each trough in turn. If the trough is fastened by elastic suspension elements in a frame, this pulsation can be cirtually entirely damped out.

Figure 12:
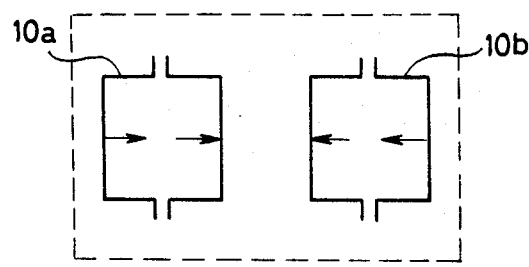
FIG. 12 is a schematic cross section through two conveyor boxes set up side by side.
Figure 13:
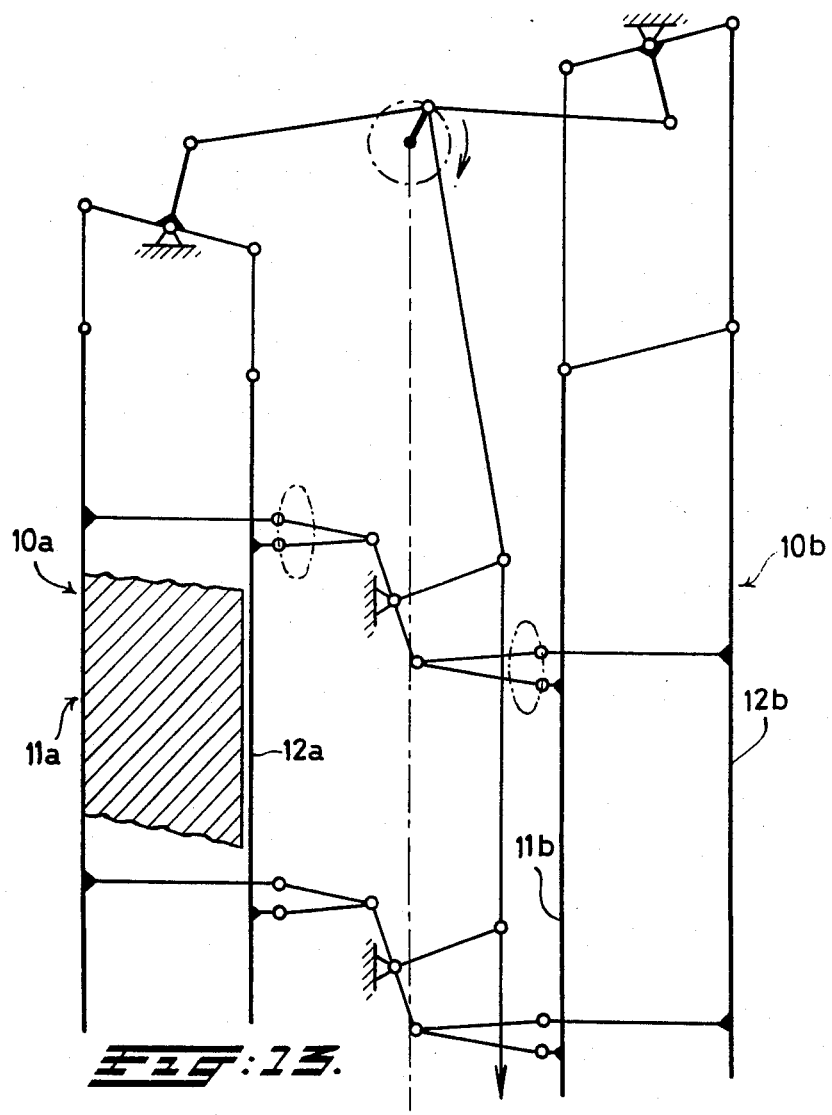
FIG. 13 is a schematic view of the drive of two conveyor boxes set up side by side.

In the direction transverse to the lengthwise direction of the conveyor box (Y-direction in FIG. 1) one single conveyor box is not balanced. If two adjacent conveyor boxes 10a and 10b, moving in the same plane (see FIG. 12) are used, the device can be fully balanced in the direction transverse to the direction of conveyance, inclusive of filling. The two conveyor boxes 10a and 10b move transversely to the direction of conveyance in opposite directions. FIG. 13 shows schematically how the troughs 11a and 12a and 11b and 12b of two such adjacent conveyor boxes 10a and 10b can be driven be means of a rod mechanism.

Figure 14:
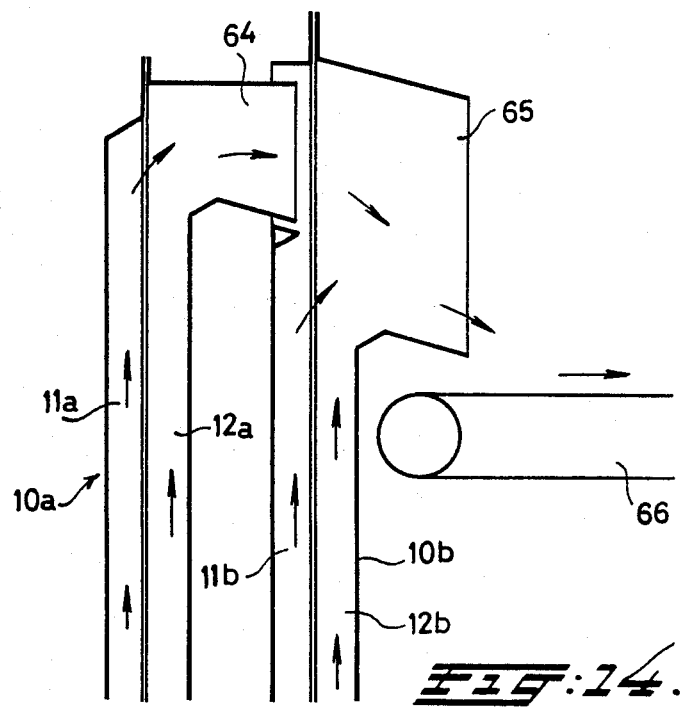
FIG. 14 is a view of the output side of two conveyor boxes set up side by side.

FIG. 14 shows the output side of two adjacent conveyor boxes 10a and 10b. The two conveyor boxes which are disposed in the bottom of the troughs 12a and 12b. Through these openings the material conveyed by the conveyor boxes is thrown onto a discharge belt 66 without the two conveyor boxes 10a and 10b adversely affecting each other.

The above-described conveyor box made up of two trough-type elements can be regarded as a sort of double throwing trough, in which the free throwing of the material to be conveyed is replaced by a controlled movement of the material. This has the following advantages:

Conveyance of the material is possible at any angle: from horizontal to vertical.

The possible conveyance speeds are a multiple of those which can be achieved with existing throwing troughs.

Very large capacities and a very high output are achieved by comparison with existing conveyance systems, such as pneumatic lifts, screw conveyors and throwing troughs.

What is claimed is:

1. A device for the conveyance of material, in particular bulk material, comprising at least one trough-type conveyor element with a cyclical drive for transmitting a propelling force periodically to the material present in the trough-type conveyor element at least in the envisaged direction of conveyance, wherein provision is made for at least two parallel, mating trough-type conveyor elements which can move lengthwise relative to each other, and which each have an essentially U-shaped cross section and with their open sides face each other, with the free edges of the side walls essentially resting against each other, so that a closed conveyance space is produced in the form of an oblong conveyor box, and the two trough-type conveyor elements are provided with a cyclical drive which acts both transversely to and in the lengthwise direction of the trough-type conveyor elements, the drive of the two elements when transverse to the lengthwise direction being in phase, and in the lengthwise direction exhibiting a relative phase shift of about 180 degrees.

2. Device according to claim 1, wherein one of the two trough-type conveyor elements is coupled to a drive mechanism, and the two trough-type elements are connected together by means of spring elements acting in the direction of conveyance.

3. Device according to claim 2, wherein the spring elements comprise leaf springs running transversely to the trough-type elements, and being connected by their ends to the side walls of the trough-type elements.

4. Device according to claim 1, wherein the two trough-type conveyor elements are connected to each other by means of at least one pair of mating toothed wheels, at least one of which can be driven.

5. Device according to claim 4, wherein the toothed wheels connected to one of the trough-type conveyor elements are coupled to each other by means of a synchronization rod running in the lengthwise direction parallel to the trough-type element, while the fastening points of the trough-type element and the synchronization rod on a toothed wheel are at an angle to each other which is smaller than 180 degrees, and is preferably 90 degrees.

6. Device according to claim 1, wherein the device is provided with a rod mechanism for driving the two trough-type conveyor elements both transversely to and in the direction of the conveyance.

7. Device according to claim 6, wherein the rod mechanism is provided with a central drive.

8. Device according to claim 1, wherein the drive of the two trough-type conveyor elements is such that the amplitude of the movement of the two trough-type elements transverse to the direction of conveyance differs from that in the direction of conveyance.

9. Device according to claim 8, wherein the amplitude of the movement in the direction of conveyance is greater than that transverse to the direction of conveyance.

10. Device according to claim 1, wherein each of the two trough-type conveyor elements is provided on the outside, near the free edges of the side walls with an outward-projecting flange running in the lengthwise direction of the trough-type element, the free edge of which flange is bent over in the direction of the other trough-type element, so that an additional conveyor box with smaller transverse dimensions is obtained at both sides of the conveyor box.

11. Devide according to claim 1, wherein the conveyor box is made double at the infeed side over a certain length with a common two-sided trough-type conveyor element disposed between the two adjacent conveyor boxes, while the ends of the two outside trough-type elements at the infeed side are connected together by a closed end wall, and the end of the common trough-type conveyor element is at a distance from the closed end wall.

12. Device according to claim 1, wherein the device is provided at the infeed side of the conveyor box with at least one screw conveyor for the infeed of the material to the conveyor box.

13. Device according to claim 12, wherein the screw conveyor is placed on the side edge of the conveyor box, while the axis of the screw conveyor is perpendicular to the lengthwise direction of the conveyor box, and the pitch of the conveyor screw increases to infinity towards the end of the screw, so that the conveyor screw operates there as an axially fed throwing wheel.

14. Device according to claim 1, wherein the device comprises two parallel conveyor boxes which can move in opposite directions transversely to the direction of conveyance.

15. Device according to claim 1, wherein the conveyor box is provided at the outlet side with an outlet opening which is disposed in the bottom of one of the two trough-type conveyor elements of the conveyor box, through which the material from the conveyor box can be thrown onto a discharge belt.

16. Device according to claim 1, wherein the bottoms of the troughs are rough on the inside, while the insides of the side walls of the troughs are smooth.

17. Device according to claim 1, wherein the bottoms of the trough are provided with openings such that they can act as sieves.

* * * * *